(12) United States Patent
Kurasawa et al.

(10) Patent No.: US 6,610,442 B2
(45) Date of Patent: Aug. 26, 2003

(54) RESIN COMPOSITION AND RESIN MOLDINGS USING THE SAME

(75) Inventors: Yoshihiro Kurasawa, Hiratsuka (JP); Naoto Obayashi, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 111 days.

(21) Appl. No.: 09/873,868

(22) Filed: Jun. 4, 2001

(65) Prior Publication Data
US 2002/0035206 A1 Mar. 21, 2002

(30) Foreign Application Priority Data

Jun. 5, 2000 (JP) .......................... 2000-167079

(51) Int. Cl.$^7$ ............... H01M 2/02; C08L 23/10; C08L 71/12
(52) U.S. Cl. ............. 429/176; 428/35.7; 428/36.8; 525/92 D; 525/133
(58) Field of Search ............. 525/133, 92 D; 428/35.7, 36.8; 429/176

(56) References Cited

U.S. PATENT DOCUMENTS

| | | | |
|---|---|---|---|
| 3,361,851 A | 1/1968 | Gowan | |
| 4,863,997 A | 9/1989 | Shibuya et al. | |
| 6,045,883 A | 4/2000 | Akiyama et al. | |

FOREIGN PATENT DOCUMENTS

JP   8-195188   7/1996

*Primary Examiner*—Patricia A. Short
(74) *Attorney, Agent, or Firm*—David G. Conlin; Lisa Swiszcz Hazzard; Edwards & Angell

(57) ABSTRACT

The present invention relates to a resin composition comprising 5 to 60 parts by weight of a polyphenylene ether resin and 40 to 95 parts by weight of a crystalline polypropylene resin, and further containing a hydrogenation product of an aromatic vinyl compound-conjugated diene copolymer in an amount of 1 to 30 parts by weight based on 100 parts by weight of said polyphenylene ether resin and crystalline polypropylene resin combined, said crystalline polypropylene resin forming a continuous phase while said polyphenylene ether resin forming a disperse phase, the ratio of the weighted average inter-particle-wall distance ($L_w$) to the added average inter-particle-wall distance ($L_n$) of said disperse phase, $L_w/L_n$, being 1.0 to 3.0.

14 Claims, 3 Drawing Sheets

RESIN COMPOSITION AND RESIN MOLDINGS USING THE SAME

BACKGROUND OF THE INVENTION

The present invention relates to a resin composition for welding having high mechanical strength, impact resistance, heat resistance and chemical resistance as well as excellent weld strength and stability, which composition can be utilized as industrial material in the various fields of industry such as electric and electronic field and automobile field. The present invention also relates to moldings and a secondary battery container using the said resin composition.

Since polyphenylene ether resins are excellent in mechanical strength, heat resistance, electrical properties and dimensional stability, they are used for a variety of industrial products such as electric and electronic parts, OA equipment parts and automobile parts. These resins, however, have the disadvantage of being poor in chemical resistance because they are amorphous resins, so that they are hardly available for applications where oils or chemicals are likely to contact to the product.

On the other hand, polypropylene resins are inexpensive and lightweight and also excel in moldability and chemical resistance, so that they are used very widely for a variety of industrial products such as automobile-related parts like bumper, sheets, films, etc. These resins, however, are inferior to polyphenylene ether resins in the aspect of mechanical strength and heat resistance.

So, there has been proposed a polyblend which combines the advantages of the said two types of resin, namely a composition which possesses both of the toughness and heat resistance of polyphenylene ether resins and the heat resistance of polypropylene resins.

For example, U.S. Pat. No. 3,361,851 teaches that a composition with excellent chemical resistance can be obtained by blending a polyphenylene ether and a polyolefin resin. Also, Japanese Patent Application Laid-Open (KOKAI) Nos. 63-113058 and 2-305814 teach that the compatibility of polyphenylene ether resins and polyolefin resins can be improved by adding a hydrogenated block copolymer to a composition comprising the said two types of resin.

Capitalizing on these advantages of a blend of a polyphenylene ether resin and a polypropylene resin, Japanese Patent Application Laid-Open (KOKAI) Nos. 8-195188 and 9-120801 propose application of such a resin blend for the molding of a closed battery container. This proposal is intended to improve mechanical strength and heat resistance by the blending of a polyphenylene ether resin while securing chemical resistance and vapor barrier properties provided by the polypropylene resin. Indeed, these techniques make it possible to obtain chemical resistance, mechanical strength and heat resistance that could never be obtained by single use of a conventional polypropylene resin or polyphenylene ether resin.

However, with commercialization of electric cars in recent years, stricter requirements are demanded at the closed type secondary batteries used for such electric cars. Specifically, requirement for higher pressure resistance at high temperatures is imminent in the face of the necessity for the rise of working temperature and internal pressure which is essential for producing higher power.

In use of a polyphenylene ether/polypropylene resin blend for manufacturing a pressure vessel such as a secondary battery container, the method of closing the vessel is an important factor. Usually, welding is used for joining the vessel body and the cover for closing the vessel because of the simplicity of the operation. As examples of the method of welding, there are used "hot plate welding" in which the resin parts to be welded are brought into contact with a heated plate to fuse the surfaces of the resin part to thereby effect desired welding, "vibration welding" which comprises fusing the surfaces of the resin part by means of vibration, and "ultrasonic welding" according to which surface fusion is effected by the application of ultrasonic waves. However, when using a conventional polyphenylene ether/polypropylene resin blend, the weld strength provided by these welding means is low and the problem is pointed out that the weld zone may be forced to come off when an internal pressure is exerted thereto. Especially, there is a wide scatter of weld strength, posing a serious problem in practical use of the blend.

As a result of the present inventors' earnest studies to solve the above problem, it has been found that a resin composition comprising a block copolymer of a polyphenylene ether resin and a crystalline polypropylene resin and having a specific structural form has excellent mechanical strength, heat resistance, impact resistance and chemical resistance as well as high weld strength and stability.

The present invention has been attained on the basis of the above finding.

SUMMARY OF THE INVENTION

The object of present invention is to providing a resin composition suited for welding having excellent mechanical strength, heat resistance, impact resistance and chemical resistance and capable of providing high weld strength with good stability.

The other object of the present invention is to provide resin moldings and a secondary battery container produced from the said resin composition by making the best use of its advantageous properties mentioned above.

To attain the above aim, in the first aspect of the present invention, there is provided a resin composition comprising 5 to 60 parts by weight of a polyphenylene ether resin and 40 to 95 parts by weight of a crystalline polypropylene resin, and further containing a hydrogenation product of an aromatic vinyl compound-conjugated diene copolymer in an amount of 1 to 30 parts by weight based on 100 parts by weight of said polyphenylene ether resin and crystalline polypropylene resin combined, said crystalline polypropylene resin forming a continuous phase while said polyphenylene ether resin forming a disperse phase, the ratio of the weighted average inter-particle-wall distance ($L_w$) to the added average inter-particle-wall distance ($L_n$) of said disperse phase, $L_w/L_n$, being 1.0 to 3.0.

In the second aspect of the present invention, there is provided a resin molding comprising the resin composition as defined in the first aspect.

In the third aspect of the present invention, there is provided a secondary battery container comprising the resin composition as defined in the first aspect.

DETAILED DESCRIPTION OF THE INVENTION

Figure 1:
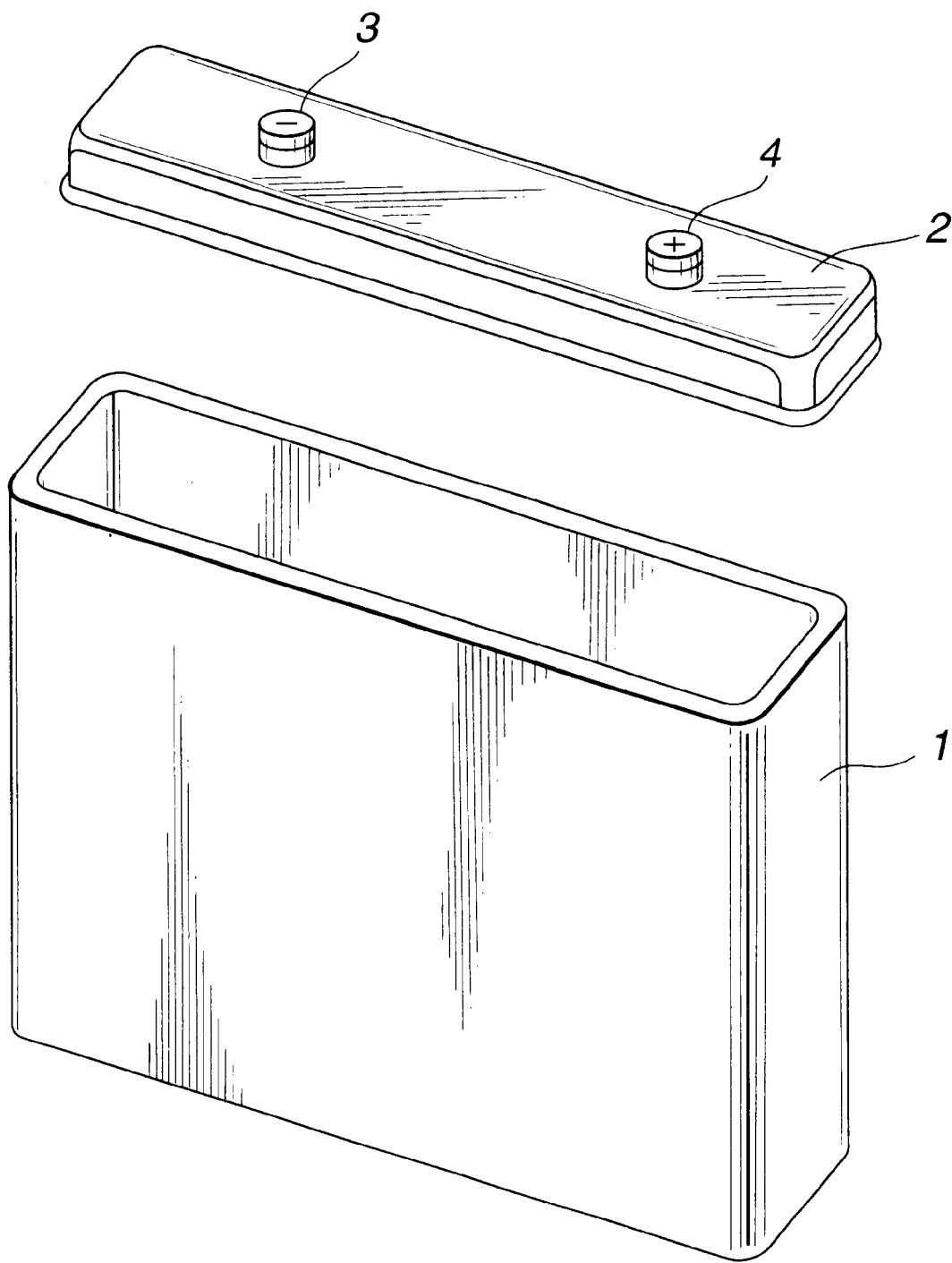
FIG. 1 is a schematic illustration of a secondary battery container which is an example of use of the resin moldings according to the present invention. 1: battery container body; 2: battery container cover; 3: anode terminal; 4 cathode terminal.

The "polyphenylene ether resin" used in the present invention is a polyphenylene ether or a mixture of a polyphenylene ether and a styrene resin. The "polyphenylene ether" used in the present invention is a homopolymer or a copolymer having a molecular structure represented by the following formula:

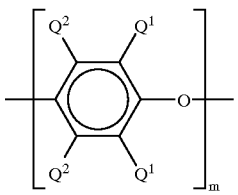

wherein $Q^1$'s represent independently a halogen atom, a primary or secondary alkyl group, an aryl group, an aminoalkyl group, a hydrocarbon oxy group or a halohydrocarbon oxy group; $Q^2$'s represent independently a hydrogen atom, a halogen atom, a primary or secondary alkyl group, an aryl group, a haloalkyl group, a hydrocarbon oxy group or a halohydrocarbon oxy group; and m is a number of not less than 10. Preferred examples of the primary alkyl groups represented by $Q^1$ and $Q^2$ are methyl, ethyl, n-propyl, n-butyl, n-amyl, isoamyl, 2-methylbutyl, n-hexyl, 2,3-dimethylbutyl, 2-, 3- or 4-methylpentyl and heptyl. Preferred examples of the secondary alkyl groups are isopropyl, sec-butyl and 1-ethylpropyl. More preferably, $Q^1$ is an alkyl or phenyl group, especially a $C_1$–$C_4$ alkyl group, and $Q^2$ is a hydrogen atom.

Preferred examples of the polyphenylene ether homopolymers are the ones comprising 2,6-dimethyl-1,4-phenylene ether units.

Preferred examples of the said copolymers are the random copolymers comprising a combination of the said units and 2,3,6-trimethyl-1,4-phenylene ether units. Many preferred homopolymers and random copolymers are described in various prior literatures, and their use is not restricted in the present invention. For instance, the polyphenylene ethers containing a molecular structure portion useful for improving molecular weight, melt viscosity and/or other properties such as impact strength can be used preferably.

The polyphenylene ether used in the present invention is preferably one whose intrinsic viscosity measured in chloroform at 30° C. is 0.2 to 0.8 dl/g, more preferably 0.2 to 0.7 dl/g, especially preferably 0.25 to 0.6 dl/g. When the intrinsic viscosity of the polyphenylene ether is less than 0.2 dl/g, the obtained composition may be poor in impact resistance, and when the intrinsic viscosity exceeds 0.8 dl/g, the composition may be unsatisfactory in moldability.

The styrene resin used in the present invention is preferably polystyrene or rubber-reinforced polystyrene. It is used in an amount of preferably 0 to 80% by weight to 100% by weight of the polyphenylene ether and styrene resin combined. When its amount exceeds 80% by weight, heat resistance of the composition may lower intolerably.

The crystalline polypropylene resin used in the present invention is a crystalline resin mainly comprising propylene as the structural units, such as propylene homopolymer and copolymers of propylene (main component) and α-olefins such as ethylene, butene-1, hexene-1, heptene-1 and 4-methylpentene-1. These copolymers may be either random copolymers or block copolymers, but they are preferably block copolymers in which a structure where a poly (α-olefin) domain is dispersed in a polypropylene matrix. Especially propylene homopolymer and propylene-ethylene block copolymer are preferred. The density of the propylene homopolymer portion in these polypropylene resins, as determined according to JIS K7112, is preferably not less than 0.906 g/cm³, more preferably not less than 0.907 g/cm³, even more preferably not less than 0.908 g/cm³. Use of a polypropylene resin with a density of not less than 0.906 g/cm³ contributes to the improvement of mechanical strength, heat resistance and vapor barrier properties of the composition. In addition, the density of the propylene homopolymer portion in these polypropylene resins, as determined according to JIS K7112, is preferably not more than 0.935 g/cm³, because it is usually difficult to obtain the propylene homopolymer having the density of more than 0.935 g/cm³.

Propylene resin density can be determined, in the case of propylene homopolymer, by compression or injection molding the polypropylene resin into a prescribed test piece and measuring its density by the underwater substitution method of JIS K7112.

In the case of the copolymers, there can be used, for example, a method in which the propylene homopolymer is extracted in the polymerization operation and then the above-mentioned underwater substitution method is carried out, or a method in which the copolymer portion is extracted using a solvent such as hexane and the density of the remaining propylene homopolymer portion is determined by the above-mentioned JIS K7112 method.

The density of the propylene homopolymer portion in the whole composition can be determined by extracting the composition using a good solvent of polyphenylene ether, such as chloroform, and measuring the density of the remaining propylene resin by the above method.

These polypropylene resins can be produced by, for example, a method of obtaining a polypropylene resin of the said density by polymerization or a method in which a nucleating agent is added to a polypropylene resin with a density below the desired level to thereby increase the density.

In the present invention, it is possible to use any nucleating agent which is capable of improving the crystallinity of polypropylene resins. Typical examples of such nucleating agents include organic nucleating agents such as metal salts of aromatic carboxylic acids, sorbitol-based derivatives, organic phosphates, aromatic amide compounds, etc., and inorganic nucleating agents such as talc.

The melt flow rate of these polypropylene resins (measured according to JIS K7210 at 230° C. under a load of 21.17 N) preferably falls within the range of 0.1 to 10 g/10 min, more preferably 0.2 to 8 g/10 min, even more preferably 0.3 to 6 g/10 min. When the melt flow rate is less than 0.1 g/10 min, the obtained composition may be poor in moldability, and when the melt flow rate exceeds 10 g/10 min, the composition may be poor in mechanical strength.

In the present invention, in order to improve impact strength, a hydrogenation product of a block copolymer comprising an aromatic vinyl compound polymer block A and a conjugated diene compound polymer block B is added. The "block copolymer" referred to herein is an aromatic vinyl compound-conjugated diene block copolymer of a structure having at least one chain block A derived from the aromatic vinyl compound and at least one block B derived from the conjugated diene, and the arrangement of these blocks A and B may be such as forming a linear, branched or tapered structure. Such a structure may contain in a part thereof a random chain derived from the aromatic vinyl compound-conjugated diene random copolymer portion. In the present invention, a block copolymer of a linear structure is preferred, and that of a triblock structure is especially preferred.

The "hydrogenation product of the block copolymer" is a block copolymer in which the aliphatic unsaturated groups of block B have been decreased by hydrogenation, with the ratio of the unsaturated bonds remaining unhydrogenated being preferably not more than 20%, more preferably not more than 10%, although it is not specifically defined. Such a hydrogenated block copolymer may be used in combination with a non-hydrogenated block copolymer.

Preferred examples of the aromatic vinyl compounds usable in the present invention are styrene, α-methylstyrene, paramethylstyrene, vinyltoluene and vinylxylene. Styrene is especially preferred.

The conjugated diene is preferably 1,3-butadiene, isoprene or 2-methyl-1,3-butadiene.

Examples of the block copolymers are styrene-butadiene-styrene block copolymer and styrene-isoprene-styrene block copolymer. These block copolymers may be used either singly or as a mixture of two or more of them.

In the aromatic vinyl compound-conjugated diene block copolymer, the ratio of the repeating units derived from the aromatic vinyl compound preferably falls within the range of 50 to 85% by weight, more preferably 55 to 85% by weight, even more preferably 60 to 80% by weight. By using a block copolymer in which the ratio of the repeating units derived from the aromatic vinyl compound is 50 to 85% by weight, it is possible to improve compatibility of the polyphenylene ether resin and the polypropylene resin.

As a measure of molecular weight of these block copolymers and their hydrogenation products, their viscosity as measured in a toluene solution at 25° C. preferably falls within the range of 30,000 to 10 cps, more preferably 10,000 to 30 cps. When the viscosity is higher than 30,000 cps, the final composition may be unsatisfactory in moldability, and when the viscosity is less than 10 cps, the composition may be poor in mechanical strength.

The resin composition of the present invention may contain where necessary as other component(s) a material or materials well known as thermoplastic resin additives, such as antioxidant, weathering agent, nucleating agent, impact modifier, plasticizer and fluidity improver. Addition of an organic filler, reinforcing agent and inorganic filler, such as glass fiber, talc, mica, kaolin, calcium carbonate, silica, clay and the like, is effective for improving rigidity, heat resistance and dimensional properties. It is also possible to use various types of colorant and dispersants therefor as required.

In the present invention, it is also preferable to add a flame-retardant to afford flame retardancy to the composition. The flame-retardant used in the present invention is not specified; it is possible to use various known types of flame-retardant in an amount necessary for obtaining the desired degree of flame retardancy. Preferably a phosphorus type, halogen type or inorganic flame-retardant and/or its assistant, or a mixture of these types of flame-retardant may be used in an amount of 1 to 50 parts by weight based on 100 parts by weight of the resin moiety.

The ratios of the above-described components in the composition are such that, when the total amount of the polyphenylene ether resin and the polypropylene resin is supposed to be 100 parts by weight, the polyphenylene ether resin is in the range of 5 to 60 parts by weight, preferably 10 to 50 parts by weight, especially 15 to 45 parts by weight, and the crystalline polypropylene resin is in the range of 40 to 95 parts by weight, preferably 50 to 90 parts by weight, especially 55 to 85 parts by weight. When the polyphenylene ether resin is less than 5 parts by weight, the composition may be poor in heat resistance and rigidity, and when the polypropylene resin is less than 40 parts by weight, the composition may be unsatisfactory in vapor barrier properties and weld strength.

The ratio of the hydrogenation product of the aromatic vinyl compound-conjugated diene copolymer in the composition is in the range of 1 to 30 parts by weight, preferably 3 to 25 parts by weight, especially preferably 5 to 20 parts by weight. When the said ratio is less than 1 part by weight, no satisfactory impact resistance may be obtained, and when the ratio exceeds 30 parts by weight, heat resistance may be unsatisfactory.

The ratio (by weight) of the polyphenylene ether resin/hydrogenation product of the aromatic vinyl compound-conjugated diene copolymer preferably falls within the range of 1/1 to 10/1, more preferably 1.2/1 to 8/1, especially preferably 1.4/1 to 6/1, when the total amount of the polyphenylene ether resin and the polypropylene resin is supposed to be 100 parts by weight. When the polyphenylene ether resin/hydrogenation product of the aromatic vinyl compound-conjugated diene copolymer ratio is within the above-defined range, a better balance of heat resistance and impact resistance can be obtained.

In the present invention, the crystalline polypropylene resin forms a continuous phase while the polyphenylene ether resin forms a disperse phase, and the ratio of the added average inter-particle-wall distance ($L_n$)/weighted average inter-particle-wall distance ($L_w$) of the said disperse phase, $L_w/L_n$, is in the range of 1.0 to 3.0, preferably 1.0 to 2.0, especially 1.0 to 1.5.

The "added average inter-particle-wall distance ($L_n$)" and the "weighted average inter-particle-wall distance ($L_w$)" referred to herein are the values determined from the following equations.

Added average inter-particle-wall distance ($L_n$):

$$L_n = \frac{L_1 + L_2 + \ldots L_I}{I}$$

wherein $L_1, L_2, \ldots L_I$ indicate the measured values of inter-wall distance of $1, 2, \ldots$ and I particles, respectively.

Weighted average inter-particle-wall distance ($L_w$):

$$L_w = \frac{(L_1)^2 + (L_2)^2 + \ldots (L_I)^2}{L_1 + L_2 + \ldots L_I}$$

wherein $L_1, L_2, \ldots L_I$ indicate the measured values of inter-wall distance of $1, 2, \ldots$ and I particles, respectively.

When the $L_w/L_n$ ratio exceeds 3.0, weld strength scatters too widely. In the present invention, it was tried to see the distribution of inter-particle-wall distance by taking the ratios of added mean value (arithmetical mean value) and weighted mean value of inter-wall distance of the dispersed particles of the polyphenylene ether resin in the continuous phase of the polypropylene resin.

In the present invention, in a molded product obtained from a blend of a polyphenylene ether resin and a polypropylene resin, with the polypropylene resin forming a continuous phase, welding is performed on the polypropylene resin forming a continuous phase, so that there is a tendency that the larger the inter-particle-wall distance, a higher weld strength can be obtained. The present inventors have found, however, that even if the inter-particle-wall distance is simply large, scatter of weld strength widens when its distribution ($L_w/L_n$) is wide, and that such scatter of weld strength is reduced when the distribution ($L_w/L_n$) is narrowed down.

In the present invention, the disperse phase used for determining the $L_w/L_n$ ratio is the one formed by the polyphenylene ether resin, and does not include any disperse phase formed in the polypropylene resin only by the hydrogenation product of the aromatic vinyl compound-conjugated diene copolymer.

The hydrogenation product of the aromatic vinyl compound-conjugated diene copolymer mostly exists at the interface between the crystalline polypropylene resin matrix and the polyphenylene ether resin domain. The proportion in which the hydrogenation product of the aromatic vinyl compound-conjugated diene copolymer exists at the interface of polypropylene resin matrix/polyphenylene ether resin domain is preferably not less than 50% by weight, more preferably not less than 60% by weight, especially preferably not less than 70% by weight.

The morphology of the resin composition of the present invention can be confirmed by observation through a transmission electron microscope. Specifically, an ultra-thin piece is cut out by an ultramicrotome from a test piece made from the resin composition of the present invention and this ultra-thin piece is stained with ruthenium tetroxide and observed and photographed through a transmission electron microscope. This photograph is entered into a computer using a scanner, then the inter-wall distance of the dispersed particles is determined using a software (for example, Luzex available from NIRECO Ltd.), and from these determinations of inter-particle-wall distance (I=500), the distance determined from the added mean is represented by $L_n$ and the distance determined from the weighted mean is represented by $L_w$.

As the method for obtaining the resin composition of the present invention, there can be used, for instance, a method in which the said component materials are mixed by a suitable mixing means such as single- or multiple screw mixer, Banbury mixer, roll mill, Brabender Plastograph or the like, and then cooled and solidified, or a solution mixing method in which the said components are added to a suitable solvent, for example, a hydrocarbon such as hexane, butane, benzene, toluene, xylene, etc., or a derivative thereof, and the soluble components or the soluble and insoluble components are mixed in a suspended state. A melt mixing method is preferred from the viewpoint of industrial cost, but other methods are usable as well.

For obtaining the morphology specified in the present invention, it is preferable to conduct melt mixing by a double-screw extruder in such a manner that the retention time given by the following equation will become 5 to 100 seconds, more preferably 10 to 80 seconds.

$$\text{Retention time (sec)} = V \times \rho \times \phi \div Q$$

wherein V is spatial volume (cm³) of the kneading disc portion, ρ is melt density (g/cm³) of the resin, φ is rate of filling (–) of the kneading disc portion, and Q is discharge rate (g/sec).

The method of obtaining a molded product using the resin composition of the present invention is not specified; it is possible to use any molding method commonly used for the molding of the thermoplastic resin compositions, such as injection molding, blow molding, extrusion molding, sheet forming, thermoforming, rotational molding, laminate molding, etc.

The "pressure vessel" referred to in the present invention is a vessel which is subjected to an internal pressure of over 0.1 MPa. In the present invention, its effect is manifested especially in a pressure vessel to which an internal pressure of over 0.2 MPa is exerted in use, and its effect becomes further conspicuous in a pressure vessel which is subjected to an internal pressure of over 0.3 MPa. Examples of such pressure vessels are pump case and closed secondary battery container.

The present invention is highly effective in application to a molded article having a weld zone, especially, it is remarkably effective in application to a pressure vessel made up of two or more parts which are welded together. The "two or more parts" mentioned above designate, for example, a vessel body and a cover. "Welding" referred to herein is an operation of fusing and joining the parts. Its method is not specifically restricted. It is possible to use, for instance, hot plate welding, vibration welding, ultrasonic welding, such as mentioned above, and in-mold welding in which two or more parts are welded in a mold. The welding conditions are not restricted, but it is remarkable that the surface temperature of the weld zone be kept at 170 to 340° C., more preferably 190 to 320° C., especially 190 to 300° C., during the welding operation.

Figure 2:
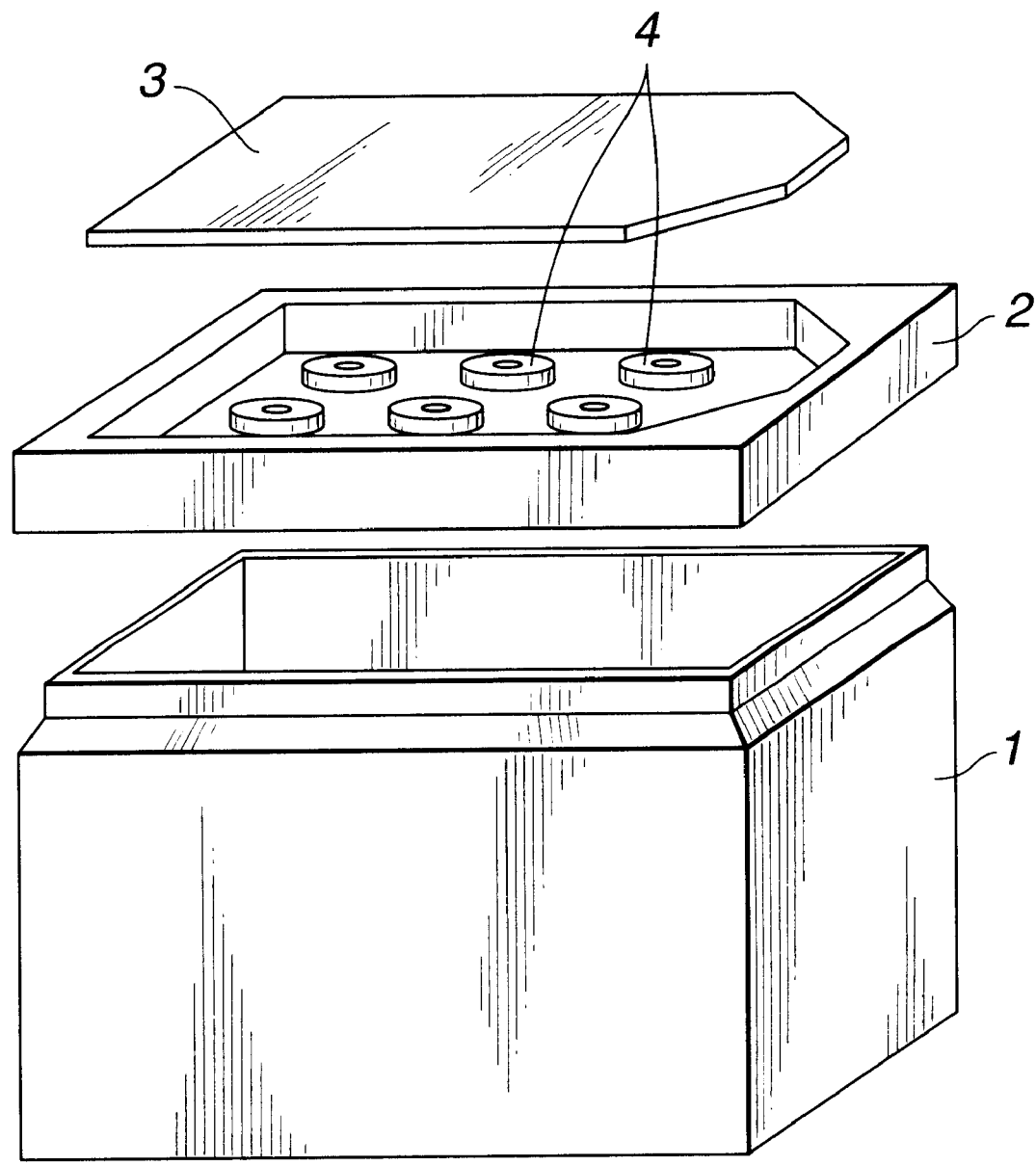
FIG. 2 is a schematic illustration of a secondary battery container which is another example of use of the resin moldings according to the present invention. 1: battery container body; 2: inner cover; 3: outer cover; 4: electrode terminals.
Figure 3:
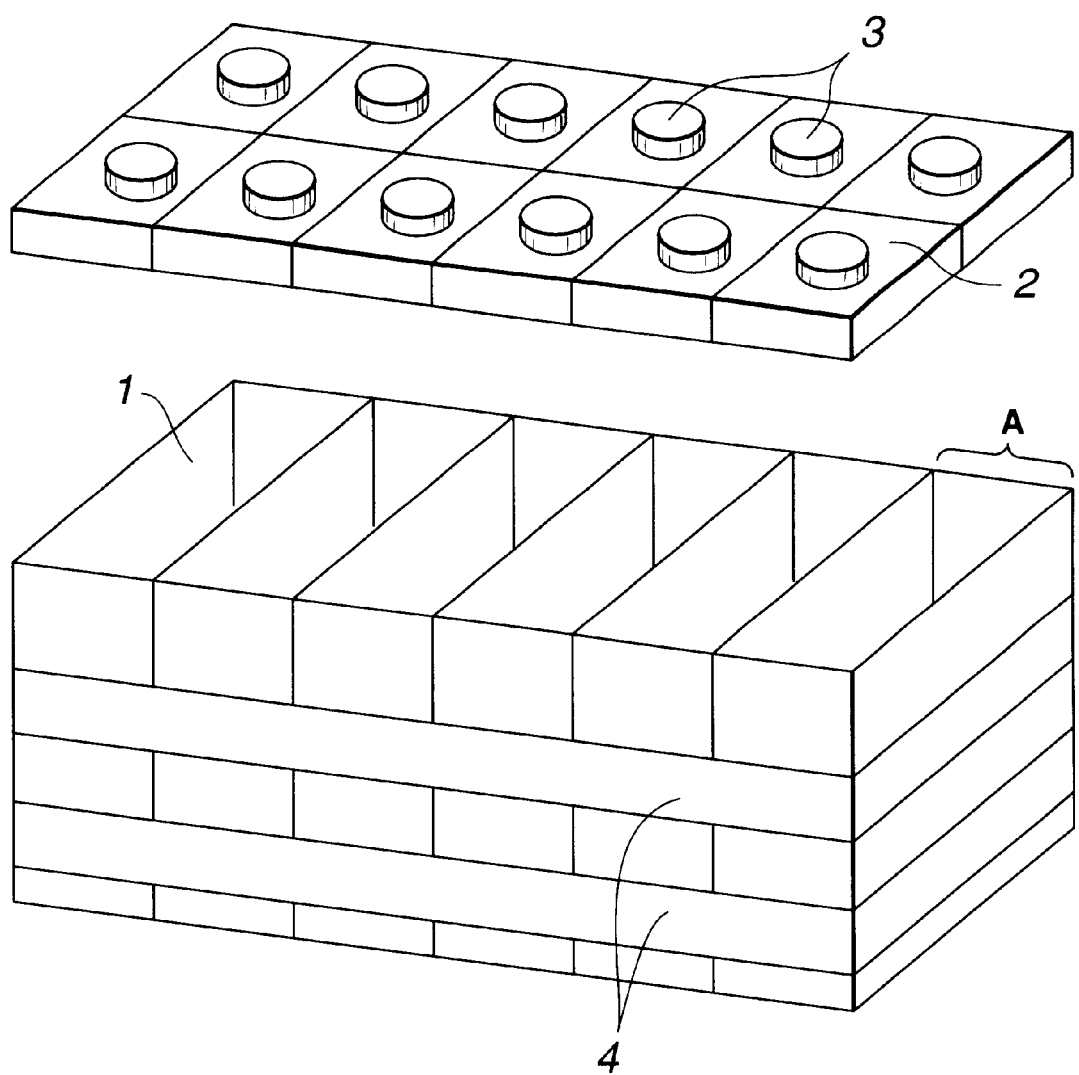
FIG. 3 is a schematic illustration of a multiple-cell secondary battery container which is still another example of use of the resin moldings according to the present invention. A: single cell; 1: integral battery container body; 2: integral cover; 3: electrode terminals; 4: binding band.

The resin composition and its moldings according to the present invention, in view of their characteristic properties, are suited for use as a secondary battery container, especially a container (or a container body and a cover) for a closed type secondary battery. The secondary batteries, to which the present invention can be applied, are the batteries capable of repeated charging and discharging, which include lead storage battery, Ni-cadmium battery, Ni-hydrogen battery and Li ion battery. The "battery container" referred to in the present invention designates not only the container body which contains the electricity-generating elements comprising a positive electrode, a negative electrode, an electrolyte and a separator, but also the parts accessory to the container, such as a cover for sealing or closing the container opening. In case where a plural number of such parts are involved, all of them need not be made of the resin composition of the present invention or the moldings thereof. The present invention finds particularly useful application to a container for a closed type secondary battery. This type of battery may be applied to video tape recorders, timepieces and such, but is best suited for use as a driving power source for electric cars. Schematic illustrations of the batteries embodying the present invention are shown in FIGS. 1, 2 and 3, to which the present invention is of course not restricted.

FIG. 1 illustrates, in a separated state, a battery container body 1 and a container cover 2 provided with a cathode terminal 3 and a anode terminal 4. The said body 1 and cover 2 are joined together by hot welding or other suitable means. FIG. 2 is an exploded illustration of a battery container body 1, an inner cover 2 provided with electrode terminals 4, and an outer cover 3 designed to cover the said electrode terminals 4. The said body 1 and inner cover 2, or the inner cover 2 and outer cover 3, are joined by hot welding or other means. The inner and outer covers may be adhered by an adhesive resin or the like. FIG. 3 shows an assemblage type closed secondary battery comprising a plurality of single cells A, such as shown in FIGS. 1 and 2, arranged in series to each other. The unitary cells A are secured in position to form a package by binding bands 4 or other means. Such an assemblage type battery container may not necessarily be an assembly of a plurality of unitary molded cells bound together by binding bands but may be an integral molding, and its shape is optional. In FIG. 3 is shown a structure in which the electrode terminals 3 are provided in an integrally molded cover 2. This structure needs to be capable of electrically connecting the unitary cells to each other.

The resin composition and its moldings obtained according to the present invention are resistant to deformation in the high-temperature and loaded environments because of their high strength and heat resistance, and are also assured of safety in the event of sticking of oils because of their high chemical resistance. Further, because of their high weld strength and stability, their products are tough and durable. Therefore, the present invention satisfies the severe performance requirements for the pressure vessels such as closed secondary battery container.

EXAMPLES

The present invention is further illustrated by the following examples, but it is to be understood that the present invention is not restricted by these examples in any way.

The component materials used in the following Examples and Comparative Examples are as described below.

1. Polyphenylene Ethers (PPE)

PPE-1: poly-2,6-dimethyl-1,4-phenylene ether (produced by Mitsubishi Engineering-Plastics Corporation; intrinsic viscosity measured in chloroform at 30° C.: 0.40 dl/g)

PPE-2: poly-2,6-dimethyl-1,4-phenylene ether (produced by Mitsubishi Engineering-Plastics Corporation; intrinsic viscosity measured in chloroform at 30° C.: 0.50 dl/g)

PPE-3: poly-2,6-dimethyl-1,4-phenylene ether (produced by Mitsubishi Engineering-Plastics Corporation; intrinsic viscosity measured in chloroform at 30° C.: 0.30 dl/g)

2. Polystyrene (PS)

HT478 (trade name, a rubber-reinforced polystyrene) produced by A & M Styrene Co., Ltd.

3. Crystalline Polypropylene Resins (PP)

PP-1: polypropylene homopolymer; MFR: 1.0 g/10 min; density: 0.909 g/cm$^3$

PP-2: polypropylene homopolymer; MFR: 1.0 g/10 min; density: 0.904 g/cm$^3$

PP-3: polypropylene homopolymer; MFR: 20 g/10 min; density: 0.905 g/cm$^3$

4. Hydrogenation Products of Aromatic Vinyl Compound-conjugated Diene Block Copolymer (SEPS)

SEPS-1: Septon 2104 (trade name, a hydrogenation product of styrene-isoprene-styrene copolymer with a styrene content of 65 wt %) produced by Kuraray Co., Ltd.

SEPS-2: Septon 4077 (trade name, a hydrogenation product of styrene-isoprene-styrene copolymer with a styrene content of 30 wt %) produced by Kuraray Co., Ltd.

Examples 1 to 6 and Comparative Examples 1, 2, 6 to 9

The resin materials shown in Table 1 were melted and mixed by a 44 mm double-screw extruder (mfd. by Japan Steel Works, Ltd.) at a cylinder temperature of 230° C., a screw speed of 250 rpm and a retention time of 30 seconds to obtain the resin compositions. Each of the obtained resin compositions was injection molded by an injection molding machine (mfd. by Japan Steel Works, Ltd.; clamping force: 55 T) at a cylinder temperature of 260° C. and a mold temperature of 40 to obtain a molded product, and it was evaluated in the manner described below.

Comparative Example 3

The resin materials shown in Table 1 were melted and mixed by a 44 mm double-screw extruder (mfd. by Japan Steel Works, Ltd.) at a cylinder temperature of 230° C., a screw speed of 250 rpm and a retention time of 4 seconds to obtain a resin composition. This resin composition was injection molded by an injection molding machine (mfd. by Japan Steel Works, Ltd.; clamping force: 55 T) at a cylinder temperature of 260° C. and a mold temperature of 40° C. to make a molded product, and it was evaluated in the manner described below.

Comparative Example 4

The resin materials were melted and mixed by a 44 mm double-screw extruder (mfd. by Japan Steel Works, Ltd.) at a cylinder temperature of 230° C., a screw speed of 250 rpm and a retention time of 180 seconds to obtain a resin composition. This resin composition was injection molded by an injection molding machine (mfd. by Japan Steel Works, Ltd.; clamping force: 55 T) at a cylinder temperature of 260° C. and a mold temperature of 40° C. to make a molded product, and it was evaluated in the manner described below.

Comparative Example 5

The resin materials were melted and mixed by a 40 mm single-screw extruder (mfd. by Tanabe, Ltd.) at a cylinder temperature of 230° C. and a screw speed of 50 rpm to obtain a resin composition. This resin composition was injection molded by an injection molding machine (mfd. by Japan Steel Works, Ltd.; clamping force: 55 T) at a cylinder temperature of 260° C. and a mold temperature of 40° C. to make a molded product, and it was evaluated in the manner described below.

Evaluation Methods (1) Izod Impact Test

A notched Izod impact test was carried out according to ASTM D256.

(2) Flexural Modulus

A three-point bending test was carried out according to the bending test method of ASTM D790.

(3) Deflection Temperature Under Load (DTUL)

A deflection-under-load test was conducted according to ASTM D648 under a pressure of 1.82 MPa.

(4) Chemical Resistance

The injection molded test piece was given a 1% bending strain and gasoline was applied to the part of the maximal strain. After allowing the test piece to stand for 48 hours, its surface condition was observed and visually evaluated.

○: No change; x: Cracked.

(5) Density of the Polypropylene Resin Used

The Izod test piece was obtained directly from the polypropylene resin used in case where it was a propylene homopolymer. In case where it was a propylene-ethylene block copolymer, the propylene homopolymer was extracted at the conclusion of polymerization and injection molded under the conditions of cylinder temperature of 220° C. and mold temperature of 40° C. to obtain a test piece. Using the thus obtained test pieces, density at 23° C. was determined from the following equation from the mass in the air and the mass in water according to the underwater substitution method of JIS K7112.

$$\rho = K \cdot a/(a-b)$$

wherein ρ is density (g/cm$^3$) of the specimen, K is water density (g/cm$^3$), a is the mass (g) of the specimen in the air, and b is the mass (g) of the specimen in water.

(6) Weld Strength

Each of the prepared compositions was molded into a 12.7 mm×127 mm×2 mm thick test piece by an injection molding machine (mfd. by Japan Steel Works, Ltd.; clamping force: 50 T) at a cylinder temperature of 250° C. and a mold temperature of 60° C. The 12.7 mm side of this test piece was brought into contact with a 285° C. hot plate under a load of 3 N for 20 seconds, and immediately after separating the test piece from the said hot plate, the melted side was pressed against the similarly melted side of another test piece under a load of 3 N for 20 seconds to effect welding. The obtained welded test piece was subjected to a tensile test using Instron at a pulling rate of 10 mm/min to determine breaking strength as a measure of weld strength. The test was conducted 10 times (n=10), and the mean value and, as an index of scatter, "maximum value−minimum value" were determined. The results are shown in Table 1.

(7) Inter-wall Distance of Dispersed Particles

A middle part along the thickness of each tensile test piece was sliced out vertically to the flow direction by an ultra-microtome to obtain an ultra-thin piece, and this piece was stained with ruthenium tetroxide and observed and photographed at x5000 magnification through a transmission electron microscope to obtain a 10,000 times magnified photograph.

This photograph was entered into a computer using a scanner, and the shortest distance between the dispersed particles (shortest inter-particle-wall distance) was determined from the index of "NEAR D" by using NIRECO Ltd.'s Luzex. From the obtained inter-particle-wall distance (I=500), $L_w/L_n$ was determined ($L_w$: inter-particle-wall distance determined from the weighted mean; $L_n$: inter-particle-wall distance determined from the added mean).

TABLE 1

| Properties | Example 1 | Example 2 | Example 3 | Example 4 |
|---|---|---|---|---|
| Formulation | | | | |
| PPE (parts by weight) | PPE-1 15 | PPE-1 20 | PPE-2 20 | PPE-2 13 |
| PS (parts by weight) | — | — | 2 | 2 |
| PP (parts by weight) | PP-1 85 | PP-1 80 | PP-1 78 | PP-1 85 |
| SEPS (parts by weight) | SEPS-1 7.5 | SEPS-1 10 | SEPS-1 10 | SEPS-1 5 |
| Properties | | | | |
| Izod impact strength (J/m) | 220 | 260 | 300 | 240 |
| Flexural modulus (MPa) | 2000 | 2020 | 1960 | 1980 |
| DTUL (° C.) | 87 | 93 | 91 | 86 |
| Chemical resistance | ○ | ○ | ○ | ○ |
| Weld strength (mean value) (MPa) | 32 | 31 | 31 | 33 |
| Maximum value − minimum value (MPa) | 8 | 7 | 7 | 8 |
| Form of dispersion $L_w/L_n$ | 1.4 | 1.3 | 1.4 | 1.4 |

| Properties | Example 5 | Example 6 | Comp. Example 1 | Comp. Example 2 |
|---|---|---|---|---|
| Formulation | | | | |
| PPE (parts by weight) | PPE-1 30 | PPE-1 40 | PPE-2 30 | PPE-1 40 |
| PS (parts by weight) | — | — | — | — |
| PP (parts by weight) | PP-2 70 | PP-2 60 | PP-3 70 | PP-2 60 |
| SEPS (parts by weight) | SEPS-1 10 | SEPS-1 10 | SEPS-1 10 | SEPS-2 10 |
| Izod impact strength (J/m) | 200 | 230 | 80 | 120 |
| Flexural modulus (MPa) | 1700 | 1780 | 1640 | 1690 |
| DTUL (° C.) | 82 | 90 | 75 | 85 |
| Chemical resistance | ○ | ○ | ○ | ○ |
| Weld strength (mean value) (MPa) | 30 | 28 | 24 | 26 |
| Maximum value − minimum value (MPa) | 8 | 7 | 13 | 12 |
| Form of dispersion $L_w/L_n$ | 1.3 | 1.4 | 3.1 | 3.2 |

| | Comp. Example 3 | Comp. Example 4 | Comp. Example 5 | Comp. Example 6 |
|---|---|---|---|---|
| Formulation | | | | |
| PPE (parts by weight) | PPE-1 40 | PPE-1 40 | PPE-1 40 | PPE-1 20 |
| PS (parts by weight) | — | — | — | — |
| PP (parts by weight) | PP-2 60 | PP-2 60 | PP-2 60 | PP-1 80 |
| SEPS (parts by weight) | SEPS-1 10 | SEPS-1 10 | SEPS-1 10 | — |
| Properties | | | | |
| Izod impact strength (J/m) | 150 | 90 | 100 | 30 |
| Flexural modulus (MPa) | 1720 | 1720 | 1710 | 1870 |
| DTUL (° C.) | 89 | 88 | 88 | 88 |
| Chemical resistance | ○ | ○ | ○ | ○ |
| Weld strength (mean value) (MPa) | 27 | 25 | 27 | 27 |
| Maximum value − minimum value (MPa) | 12 | 12 | 13 | 14 |
| Form of dispersion $L_w/L_n$ | 3.3 | 3.2 | 3.4 | 3.3 |

| | Comp. Example 7 | Comp. Example 8 | Comp. Example 9 |
|---|---|---|---|
| Formulation | | | |
| PPE (parts by weight) | PPE-3 30 | PPE-1 30 | — |
| PS (parts by weight) | — | 70 | — |
| PP (parts by weight) | PP-2 70 | — | PP-2 100 |
| SEPS (parts by weight) | SEPS-1 10 | SEPS-1 10 | — |
| Properties | | | |
| Izod impact strength (J/m) | 170 | 180 | 20 |
| Flexural modulus (NPa) | 1780 | 2350 | 1400 |
| DTUL (° C.) | | | |
| Chemical resistance | ○ | X | ○ |
| Weld strength (mean value) (MPa) | 25 | 33 | 32 |
| Maximum value − minimum value (MPa) | 13 | 8 | 7 |
| Form of dispersion $L_w/L_n$ | 3.1 | — | — |

What is claimed is:

1. A resin composition comprising 5 to 60 parts by weight of a polyphenylene ether resin and 40 to 95 parts by weight of a crystalline polypropylene resin, and further containing a hydrogenation product of an aromatic vinyl compound-conjugated diene copolymer in an amount of 1 to 30 parts by weight based on 100 parts by weight of the polyphenylene ether resin and crystalline polypropylene resin combined, the hydrogenation product of the aromatic vinyl compound-conjugated diene copolymer being a block copolymer, said crystalline polypropylene resin forming a continuous phase while said polyphenylene ether resin forming a disperse phase, the ratio of the weighted average inter-particle-wall distance ($L_w$) to the added inter-particle-wall distance ($L_n$) of said disperse phase, $L_w/L_n$, being 1.0 to 3.0.

2. A resin composition according to claim 1 wherein $L_w/L_n$ is 1.0 to 2.0.

3. A resin composition according to claim 1 wherein the hydrogenation product of the aromatic vinyl compound-conjugated diene copolymer contains 50 to 85% by weight of aromatic vinyl compound units.

4. A resin composition according to claim 1 wherein the ratio by weight of the polyphenylene ether resin/hydrogenation product of the aromatic vinyl compound-conjugated diene copolymer is 1/1 to 10/1.

5. A resin composition according to claim 1 wherein the density ($\rho$) of the propylene homopolymer portion in the polypropylene resin is not less than 0.906 g/cm³.

6. A resin molding comprising the resin composition as defined in claim 1.

7. A resin molding according to claim 6, which is a pressure vessel.

8. A resin molding according to claim 6, which includes a weld part.

9. A resin molding according to claim 7 wherein the pressure vessel is one to which an internal pressure of not less than 0.2 MPa is exerted in use.

10. A secondary battery container comprising the resin composition of claim 1.

11. A rein composition according to claim 1, wherein the hydrogenation product of an aromatic vinyl compound-conjugated diene copolymer is a styrene conjugated diene copolymer having triblock structure and a styrene content is 60 to 85% by weight.

12. A resin composition according to claim 11, wherein the styrene content is 65 to 85% by weight.

13. A resin composition according to claim 1, wherein said resin composition is prepared by conducting melt mixing resin materials by a double-screw extruder in such a manner that the retention time given by the following equation will become 10 to 80 seconds:

$$\text{retention time (sec)} = V \times \rho \times \phi / Q$$

wherein V is spatial volume (cm³) of the kneading disc portion, $\rho$ is melt density (g/cm³) of the resin, $\phi$ is rate of filling (–) of the kneading disc portion, and Q is the discharge rate (g/sec).

14. A resin composition according to claim 1, wherein maximum value–minimum value of weld strength as an index of scatter is not more than 8 MPa.

* * * * *